(No Model.) 2 Sheets—Sheet 1.
F. M. ANDERSON.
FRUIT PEELING TABLE.
No. 524,998. Patented Aug. 28, 1894.
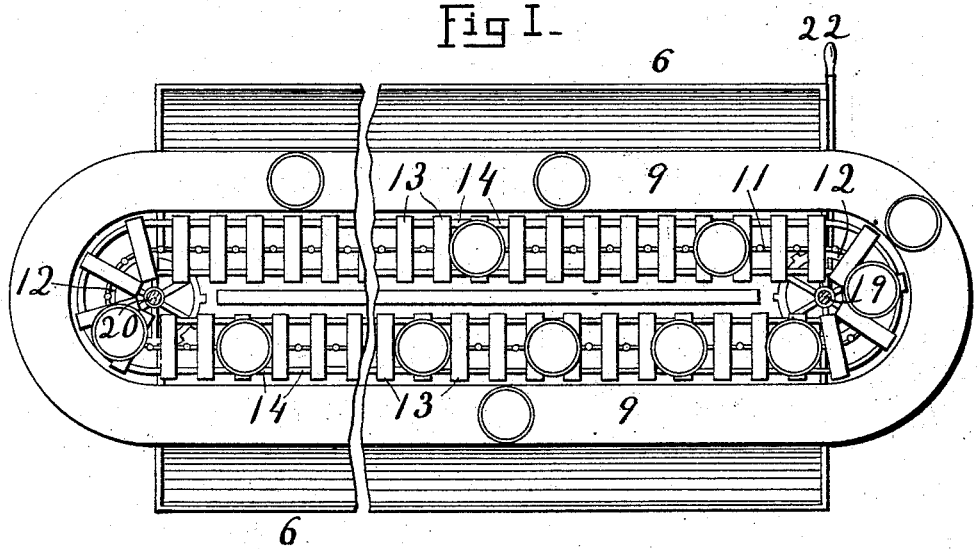
Fig I.
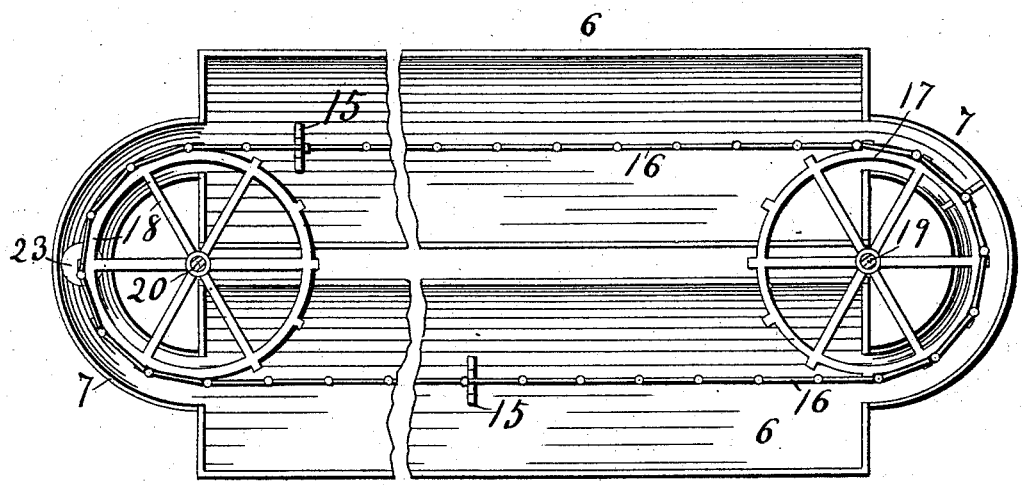
Fig II.
Witnesses,
P. Egbert Stevens.
M. E. Hillyard.
Inventor.
Frank M. Anderson.
by W. H. Stevens Atty.

(No Model.) 2 Sheets—Sheet 2.
F. M. ANDERSON.
FRUIT PEELING TABLE.
No. 524,998. Patented Aug. 28, 1894.
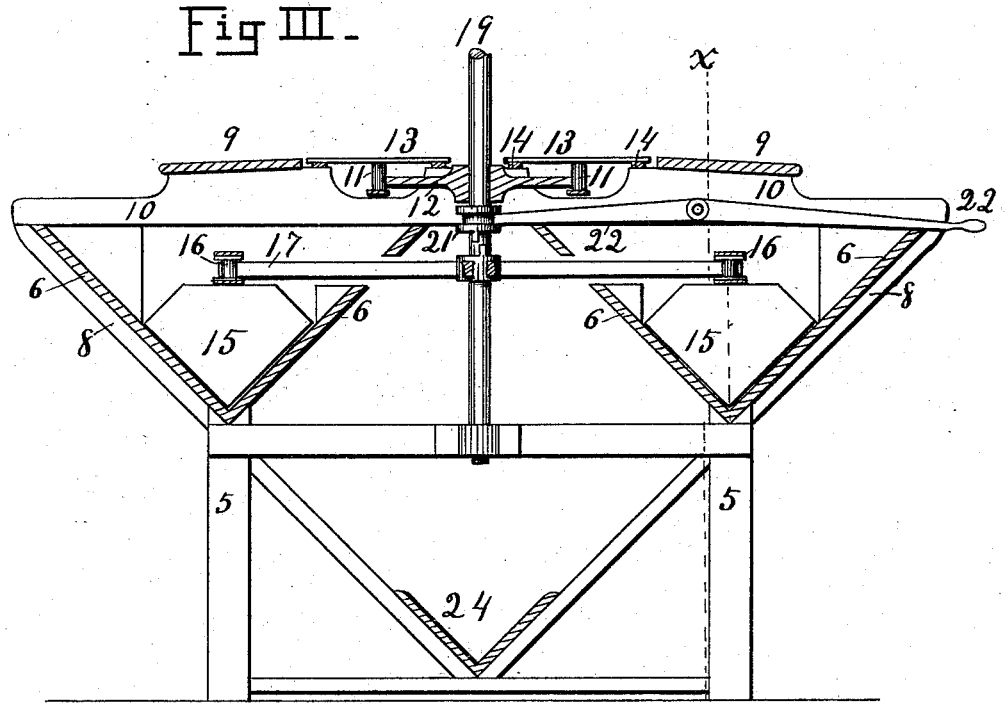
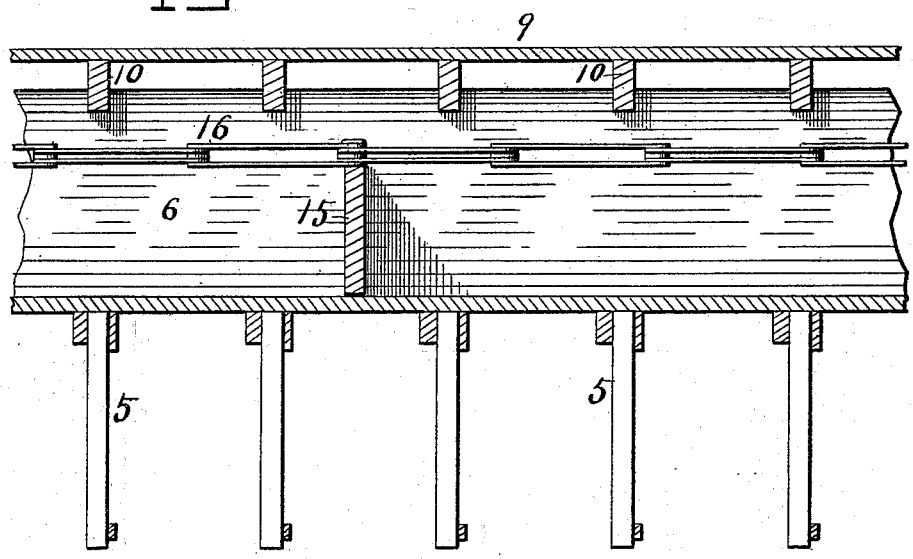
WITNESSES,
P. Egbert Stevens.
M. C. Hillyard.
INVENTOR.
Frank M. Anderson.
by W. K. Stevens Atty.

UNITED STATES PATENT OFFICE.

FRANK M. ANDERSON, OF KEOKUK, IOWA.

FRUIT-PEELING TABLE.

SPECIFICATION forming part of Letters Patent No. 524,998, dated August 28, 1894.

Application filed May 21, 1894. Serial No. 511,982. (No model.)

*To all whom it may concern:*

Be it known that I, FRANK M. ANDERSON, a citizen of the United States, residing at Keokuk, in the county of Lee and State of Iowa, have invented a new and useful Improvement in Fruit-Peeling Tables; and I do hereby declare the following to be a full, clear, and exact description of the same, reference being had to the accompanying drawings, in which—

Figure I, represents a top view of a fruit peeling table according to my invention. Fig. II, represents a top view of the same table with the top and the conveyer removed. Fig. III, represents a transverse vertical section of the table, and Fig. IV, represents a longitudinal vertical section of a portion thereof at line *x* of Fig. III.

This invention relates in general to that class of tables which are termed self-waiting, that term implying that the table is provided with mechanical means whereby articles to be used at the table are carried around conveniently near the table; and it relates more particularly to improvements in a table of this kind adapted for fruit peeler's use on which table I obtained Letters Patent No. 517,511 on April 3, 1894.

The object of the present improvement is to simplify and strengthen the mechanism; to dispense with the trough which was used as an adjunct to the paring bins to carry off slop and waste material therefrom; to adapt the paring bins each to serve as a trough; to adapt scrapers to travel in the said bins or troughs independently of the waiter or conveyer, and to adapt the scrapers to travel continuously or to be stopped and started at will.

To this end my invention consists in the construction and combination of parts hereinafter more fully described and particularly set forth in the claims, reference being had to the above described drawings, in which—

5 represents the upright portions of the frame, upon which are mounted two long paring bins 6, located parallel with each other; each bin being formed as a continuous trough having slanting sides throughout its length; and the two bins are joined by semicircular troughs 7 at the ends.

8 represents side braces connected with the uprights 5 and with the bins to stiffen the frame.

9 represents the top boards constituting the table proper. They are firmly supported upon crossties 10, which are secured to the slanting sides of the bins 6, and pass across from one bin to the other uniting the two bins firmly at various points in their length. The conveyer, consisting of the chain 11, mounted to revolve on horizontal sprocket wheels 12, and provided with slats 13 whose ends are supported to slide on rails 14 which are secured to the cross ties 10, is not the subject of any direct claim in this case.

15 represents scrapers fitted to drag in the bottom of the bins 6, and rigidly attached to a chain 16 which is mounted to revolve upon two horizontal wheels 17, 18, to travel in the bins. These wheels are journaled to revolve freely upon the shafts 19 and 20 upon which shafts the wheels 12 are fixed to revolve. One of these wheels 17, is provided with a clutch 21, having a hand lever 22 whereby this wheel may be at any time connected to revolve with the conveyer shaft 19, or be disconnected therefrom so as to remain standing still while the conveyer continues at work.

23 represents an outlet in one of the end troughs 7, and 24 represents a gutter beneath the outlet extending out of the house or to a sewer. There may be such an outlet in each trough 7. The operation is as follows: This table is supposed to be located with one end near fruit scalding apparatus and the other end near fruit-canning apparatus, and the fruit peelers sit close together along the sides of the table. Now if the machine be set in operation the conveyer will revolve continuously and buckets of scalded fruit being set on to the conveyer will be carried along the tables within reach of the peelers, and any one ready for a bucket may take it off the conveyer and stand it on the table 9 in front of himself while the other buckets continue traveling until wanted. As soon as a bucket is filled with peeled fruit it may be replaced upon the conveyer by the peeler and it is carried around until the attendant at the canning apparatus takes it off. Empty buckets are also replaced upon the conveyer by the peelers and are returned to be taken off and refilled by the attendant at the scalding apparatus. So this round may continue from morning till night. The parings and other refuse fall into the paring bins and accumulate at the bottom thereof and as often as may be desired the clutch 21 is thrown into gear by an attendant thus starting the wheel 17, and one or two revolutions of the chain 16 and scrapers thereon will carry all the refuse to the outlet 23 where it will be discharged. Then the clutch 21 may be disengaged and the scrapers be permitted to stand still until their services are again required. Of course it will be understood that the clutch may be left in gear so that the scrapers will travel all the time, but there are numerous objections to that, among which the following are noted. First, it is an unnecessary consumption of power, and wear on the troughs and machinery. Second, it is well known that some peelers are wasteful and to correct this an inspector may examine the refuse in front of each peeler before starting the scrapers to remove it, but if the scrapers were kept continually in motion with the conveyer it could not be proven who committed any waste that might be discovered in the gutter 24. Third, it will be readily understood that the refuse when gathered in little heaps while the scrapers are standing will be more readily carried along by the scrapers when started, than the same amount would be if attacked one or two slippery peelings at a time, as would be the case if the scrapers traveled as fast as the conveyer does. After a day's work is done a few buckets of water are passed around on the conveyer to be dashed by the attendants into the bins and the scrapers being kept in motion all will soon be clean. There is no hidden trough inaccessible to inspection. Each bin is its own trough. The bins also extend beneath the conveyer to catch any slop from an overfull bucket. When scrapers depend from the conveyer there is no means of connecting the tables together to stiffen them midway, but in this table the space beneath the conveyer is free to be occupied by the crossties 10, and the two tables are thereby maintained parallel with each other and these crossties serve as firm supports to the conveyer rails 14. The little extra expense of a separate scraper chain 16 and sprocket wheels 17, 18, is more than balanced by being able to dispense with an extra discharge trough and by the economy in operation. The lower corner of the bin is located directly under the top board 9 so that the scrapers and chain may be out of the peelers' way. The slanting sides of the bin not only make it more cleanly because all refuse slides directly to the bottom, but the outside slant gives more room for the knees of the peelers sitting alongside. A considerable benefit would thus be obtained from the trough shape of these peeling bins even without a mechanically operated scraper, though such a scraper is more profitable.

Having described my invention, what I claim as new, and desire to secure by Letters Patent, is the following:

1. The combination in fruit-peeling tables, of a continuous chain conveyer mounted to revolve in a substantially horizontal plane; a top board stationarily located along beside the conveyer, and a trough-shaped peeling bin located beneath the table and having a continuous inclined side extending forward of the table, substantially as described.

2. The combination in a fruit-peeling table, of a pair of parallel top-boards; a pair of peeling bins located beneath the said boards and having continuous inclined sides constituting a trough, the front sides extending beyond the boards; a pair of horizontal wheels journaled to revolve upon vertical shafts; a chain mounted on the said wheels to travel along within the said bins and scrapers on the chain, substantially as described.

3. The combination in a fruit-peeling table, of a chain conveyer mounted to revolve on horizontal wheels; tables and peeling bins alongside the conveyer; a scraper chain mounted on wheels and the wheels mounted to revolve freely upon the shafts of the said conveyer wheels; and a clutch connection between one of the said scraper chain wheels and its shaft, substantially as described.

4. The combination in a fruit-peeling table, of a chain conveyer; a rotary shaft for driving it, a fruit-peeling table discharge trough; a chain of scrapers mounted on wheels to travel in the said trough and a clutch connection between the said scraper-chain wheel and the said conveyer drive shaft substantially as described, whereby the scrapers may be driven continuously in connection with the conveyer or they may be stopped and started at will.

5. The combination in a fruit-peeling table, of a chain conveyer, tables beside it; and peeling bins each having slanting sides constituting a trough one side of which is located beneath the conveyer and table, and the other side of which extends on a continuous incline beyond the table, substantially as described.

6. The combination in a fruit-peeling table of a chain conveyer mounted to travel around horizontal wheels; a table along beside the conveyer; a discharge trough below the table; a second chain mounted to travel on wheels below the conveyer wheels, and scrapers attached to this second chain to travel in the said trough substantially as described, whereby the conveyer chain and the scraper chain may travel in planes of different heights or at different distances from a central line.

In testimony whereof I affix my signature in presence of two witnesses.

FRANK M. ANDERSON.

Witnesses:
C. J. BODE,
J. C. WEAVER.